United States Patent Office

3,347,839
Patented Oct. 17, 1967

3,347,839
POLYMERIZATION OF CONJUGATED
DIOLEFINS
Evalds Lasis, Sarnia, Ontario, Canada, assignor to Polymer Corporation Limited, Sarnia, Ontario, Canada, a body corporate
No Drawing. Filed Jan. 2, 1964, Ser. No. 335,367
Claims priority, application Canada, Jan. 5, 1963, 865,866
5 Claims. (Cl. 260—94.3)

This invention relates generally to the polymerization of conjugated diolefins. In particular, it relates to an improved process for the preparation of high trans-1,4 polymers of conjugated diolefins.

It is already known that conjugated diolefins such as butadiene-1,3 or isoprene can be polymerized to high molecular weight predominantly trans-1,4 polymers. It is also known that polydiolefins having essentially all trans-1,4 configuration are highly valued in certain applications for their high hardness and excellent resistance to cutting. Such polymers have been produced using stereospecific catalysts such as a combination of aluminum alkyl and titanium or vanadium trichloride. The catalysts hitherto used for the production of high trans-1,4 polymers either consist of solid, hydrocarbon insoluble components or form such insoluble solids on admixing. They are difficult to maintain in a fine dispersion which is required for high activity and a reproducible reaction. In addition, the catalyst particles entrapped in polymer after the polymerization complicate the recovery step. Special purification procedures must be used in order to produce a catalyst-free and undegraded material. Furthermore the yield of polymer produced using these catalysts is generally low.

It is the object of the present invention to provide an improved process for producing a polymer of an open chain or aliphatic conjugated diolefinic hydrocarbon in which at least 90% and preferably at least 95% of the diolefin monomer units are in the trans-1,4 configuration, using a hydrocarbon soluble catalyst.

The object of the invention is achieved by the process of producing a polymer of an open chain conjugated diolefinic hydrocarbon in which at least 90% of said diolefinic hydrocarbon units are in the trans-1,4 configuration which comprises polymerizing an open chain conjugated diolefinic hydrocarbon in the presence of a catalyst comprising (a) vanadium tetrachloride (b) a titanium compound having the general formula $TiX_nY_{4-n}$ wherein X is selected from the group consisting of chlorine and bromine, Y is selected from the group consisting of chlorine, bromine, iodine and a hydrocarbon radical and n is equal to 1 or 2 and (c) a lithium hydrocarbon.

In one of its narrower aspects, the object of the invention is achieved by the process of producing polyisoprene in which at least 95% of the isoprene units are in the trans-1,4 configuration which comprises polymerizing isoprene at a temperature of 0–100° C. while dispersed in an inert organic liquid which is a solvent for said polyisoprene in the presence of a catalyst comprising (a) vanadium tetrachloride, (b) a titanium tetrahalide and (c) a lithium alkyl containing 1–12 carbon atoms, the ratio of said lithium alkyl to vanadium tetrachloride being between 2:1 and 4:1 on a molar basis, and the ratio of titanium tetrahalide to vanadium tetrachloride being between 0.2:1 and 1:1 on a molar basis, said alkyl lithium and vanadium tetrachloride being admixed in the presence of isoprene.

The diolefinic hydrocarbon which can be polymerized in accordance with this invention are open chain conjugated diolefins such as butadiene-1,3 and hydrocarbon-substituted butadienes-1,3 such as isoprene, piperylene, 2,3-dimethyl butadiene, 2-phenyl butadiene and the like. Diolefins containing 4–5 carbon atoms such as butadiene-1,3 and isoprene are preferred. The invention is particularly concerned with the polymerization of isoprene. When the process of the invention is used for the production of polyisoprene a product is obtained which is high in trans-1,4 content, about 20–30% crystalline and has the hardness and hardening rate, hereinafter defined, which is generally desired for such application as golf ball covers. In the case of polybutadiene, the product is also high in trans-1,4 content and about 40–60% crystalline. However, the process is not restricted to homopolymerization. For example, a copolymer of a conjugated diolefin with a copolymerizable monomer such as a monoolefin or another diolefin can be produced according to the process of this invention in which at least 90% of the conjugated diolefinic hydrocarbon monomer units are in the trans-1,4 configuration. When it is desired to produce a copolymer having a high degree of crystallinity, it is necessary to use a minor proportion of the copolymerizable monomer. For example, a crystallinity of about 20% for trans polyisoprene is obtained in copolymers prepared according to the invention with butadiene only when the proportion of butadiene units in the copolymer is below about 20 mole percent. On the other hand a copolymer of isoprene and butadiene containing up to almost 50 mole percent of isoprene units contains more than 20% of the type of crystallinity characteristic of trans polybutadiene. Between these two composition ranges, the amount of crystallinity is less than 20% and a substantially amorphous copolymer is obtained when the mole percent of butadiene is about 35% although both the butadiene and isoprene units in the copolymer are predominantly in the trans-1,4 configuration.

The lithium hydrocarbon which may be used in the catalyst system is a compound in which at least one lithium atom is attached to a hydrocarbon radical. The size of the hydrocarbon radical is not critical, although those containing between 1 and 12 carbon atoms are the most practical and the preferred compounds are lithium alkyls containing from 1–6 carbon atoms. Examples of such lithium hydrocarbons are lithium alkyls such as ethyl lithium, n-butyl lithium, secondary and tertiary butyl lithium, amyl lithium, dodecyl lithium, methylene dilithium, ethylene dilithium, hexamethylene dilithium and the like. In addition to the saturated lithium compounds, there may also be employed unsaturated acyclic compounds such as allyl lithium, saturated and unsaturated cyclic compounds such as cyclohexyl lithium, as well as aryl, aryl alkyl and alkyl aryl compounds such as phenyl lithium, tolyl lithium, 1,4 dilithium benzene and the like. The lithium hydrocarbon may of course be the addition product formed by reaction between metallic lithium and the diolefin being polymerized.

Vanadiun tetrachloride need not be the pure grade material, and may contain some impurities such as ferric chloride, silicon chloride and the like, but it is preferred to use freshly distilled vanadium tetrachloride which is free of oxygen and moisture. Vanadium tetrachloride which has partially decomposed to solid vanadium trichloride material can also be satisfactorily used since vanadium trichloride is not an active catalyst component in the process of this invention.

A catalyst system consisting of vanadium tetrachloride and a lithium hydrocarbon is effective in polymerizing conjugated diolefins to a polymer in which the diolefin monomer units are predominantly in the trans configuration but the yield is low. It has been found that the yield is increased appreciably by the use of small amounts of certain titanium compounds as a component of the catalyst system. This is particularly surprising since these titanium compounds when combined with lithium hydrocarbons in the proportions used herein are not effective polymerization catalysts for conjugated diolefins. The titanium compounds must not contain oxygen and may be represented by the general formula $TiX_nY_{4-n}$ wherein X is selected from the group consisting of chlorine and bromine, Y is selected from the group consisting of chlorine, bromine, iodine and a hydrocarbon radical and $n$ is equal to 1 or 2. The preferred titanium compounds are hydrocarbon soluble titanium tetrahalides such as titanium tetrachloride, titanium tetrabromide, titanium trichloromonoiodide, and titanium dichlorodibromide although tetravalent compounds containing one or two hydrocarbon radicals such as titanium trichloromonobutyl, titanium dichlorodipropyl and the like may also be used. The preferred titanium compound is titanium tetrachloride.

The catalyst system is prepared "in situ," that is, in the presence of the diolefin to be polymerized. The sequence of adding the individual components is not critical provided that the vanadium tetrachloride and the lithium hydrocarbon are admixed in the presence of diolefin. For instance, vanadium tetrachloride may be mixed with the titanium compound and the mixture obtained admixed with diolefin followed by lithium hydrocarbon. Alternatively, the vanadium tetrachloride may be admixed with the diolefin followed by the addition of lithium hydrocarbon and the titanium compound. The preferred sequence in a batch process is to add to the polymerization reactor vanadium tetrachloride, the titanium compound, diolefin and finally lithium hydrocarbon. In a continuous polymerization process, all catalyst components and the diolefin may be added to the reaction mixture simultaneously using separate feeding systems for each component.

The total amount of catalyst which is required to effect polymerization may be readily determined by those skilled in the art and depends on the particular conditions such as temperature, impurities, etc. It usually varies in the range between 0.1 and 20% based on the monomer weight. The relative concentration of each of the catalyst components varies somewhat depending on conditions such as temperature and impurities, but for the production of high trans-1,4 polymers in accordance with the invention must be maintained within narrow limits. The mole ratio of the lithium hydrocarbon to vanadium tetrachloride may vary from 1:1 to 5:1, although it is preferred for best results to use a mole ratio of 2:1 to 4:1. The mole ratio of titanium compound to vanadium tetrachloride may vary between 0.01:1 and 1:1, although a ratio above 1:1 may be used if desired. A molar ratio of titanium to vanadium in the range of 0.2:1 to 1:1 is preferred.

The polymerization may be carried out over a wide range of temperatures from about −70° C. to 150° C. At the low temperatures, the reaction is rather slow and the polymers tend to precipitate. It is preferred to operate at a temperature above 0° C. It is beneficial to operate at a temperature above the melting point of polymer in order to maintain homogeneity of the polymerization system, and it is also desirable to avoid very high temperatures because of the tendency for unsaturated polymers to crosslink, degrade or cyclize at such temperatures. A temperature range of 0° C. to 100° C. is therefore preferred. The reaction is most conveniently carried out while the reactants are dispersed in a non-reactive organic liquid medium. The most useful liquids are aliphatic, alicyclic and aromatic hydrocarbons such as butane, pentane, n-hexane, n-heptane, isooctane, cyclohexane, benzene, toluene or xylene. Halogenated hydrocarbon liquids such as methylene dichloride, ethylene chloride, and carbon tetrachloride may also be used either alone or in mixtures with hydrocarbons. Liquids which are relatively low boiling and can be readily removed from the reaction product are preferred. The amount of the liquid medium is not critical, but should generally be such that the viscosity of the reactor contents is low enough to permit thorough mixing and adequate temperature control. However, the presence of a non-reactive liquid medium is not essential in the practice of the invention and the diolefin being polymerized may itself form the liquid medium.

The process of the invention is most effectively carried out in the absence of moisture, oxygen and oxygen-containing compounds such as alcohols. The diluents and monomers are desirably dried to a moisture level of less than 20 parts per million and then distilled to remove any dissolved oxygen or peroxides. As little as 0.5 mole of water, oxygen, or alcohol per mole of vanadium tetrachloride present in the reacting system inhibits the polymerization.

The invention will be described in greater detail by means of examples. Lithium hydrocarbon compounds were added as a 2.5 molar solution in n-heptane. Vanadium tetrachloride and the titanium halides were added as 0.5 molar solutions in n-heptane. The experiments were carried out using a special grade butadiene having a purity of about 99.4% and a polymerization grade of isoprene having a minimum purity of 99.4%. The monomers were dried by passing them in liquid phase first over alumina and then over molecular sieves. The aliphatic and cycloaliphatic hydrocarbon diluents were dried by passing them over alumina and molecular sieves followed by distillation. The benzene was thiophene-free and was dried by azeotropic distillation. The polymerization experiments were carried out in standard 7-ounce or 32-ounce crown capped pressure bottles which had previously been thoroughly dried at 220° F. in an electric oven, then rinsed with about 2% solution of aluminum triethyl followed with dry solvent and flushed with dry nitrogen. The bottles, filled with nitrogen, were then capped and the reaction components charged using a hypodermic needle inserted through a self sealing rubber gasket.

Structural analysis of the polymers was determined by means of an infra-red spectrophotometer. The analyses were based on the assumption that the polymers contain one unsaturated bond for each diolefin monomer units, and they are reported as trans-1,4 content on the understanding that the balance of the polymer is in the cis-1,4, 1,2 and in the case of isoprene, 3,4 configurations. The procedure for determining the structural analysis of trans-1,4 polyisoprene by infra-red spectrophotometry is time consuming and in some cases a simple X-ray procedure was used to determine their structural regularity. In this procedure solid polymers were heated in a press at a temperature about 10° C. above their melting points and then shock-cooled at a temperature approximately 70° C. below their melting points. The crystallinity was determined by measuring areas under crystalline peaks ($A_c$) and amorphous peak ($A_{am}$) in the X-ray diffraction curve and expressed as the ratio of crystalline area to the sum of crystalline and amorphous areas. For example, in the case of transpolyisoprene, the crystallinity equals $$\frac{A_c}{A_c + 0.7 A_{am}} \times 100$$

The above method is simple and gives reproducible results suitable for comparative studies. Balata which is 98% trans-1,4 polymer showed 32±2% crystallinity by this method. Synthetic polymers of isoprene of high trans-1,4 content prepared according to this invention frequently showed similar or even higher crystallinity. Trans polybutadiene is usually more crystalline than polyisoprene and the crystallinity varies between 40 and 60%.

The regularity of the structure of trans polymers was also judged by the hardness and hardening rate. The hardness was measured on a hot press-moulded sample which was conditioned at 20° C. for 24 hours. The hardness is expressed in pounds of weight required to force a ¼" ball into the sample to a depth of 0.02 inch. The hardening rate of trans polyisoprene was determined using a Wallace micro hardness tester made by H. W. Wallace & Co., Ltd., of Croydon, England. A sample of polymer was conditioned for 10 minutes at 100° C. and then cooled at 20° C. for 15 minutes. As the sample was cooled and hardened, the hardness was measured at about two minute intervals. Three hardness values expressed in the Standard Degrees Scale (ISO°) are reported in specific examples: (1) the original hardness of cold polymer, (2) hardness of the hot conditioned polymer after 3 minutes of cooling and (3) hardness after 8 minutes of cooling. Balata usually recovered its original hardness in less than 8 minutes, whereas polymers of a lower stereoregularity required a longer time. Tests of other physical properties such as stress-strain and tear strength were performed on hot press-moulded microtensile sheets using a conventional Instron tester.

*Example I*

Isoprene was polymerized in each of three 32-ounce bottles using the following recipe:

Benzene _____milliliters__ 300
$TiCl_4$ _____moles__ $0.5 \times 10^{-3}$
$VCl_4$ _____do____ $2.5 \times 10^{-3}$
Isoprene _____milliliters__ 30
Lithium n-butyl _____ Variable The ingredients were charged in the order shown in the above recipe. After the addition of the last component, the bottles were re-capped and placed in three different water baths maintained at temperatures of 15° C., 30° C. and 65° C. The bottles were rotated slowly end-over-end for 16 hours after which the reaction was stopped by the injection of about 20 milliliters of ethanol. The product in each bottle was next transferred to a separate flask and extracted with boiling ethanol containing 1% by weight of ditertiary butyl p-cresol. The extracted products were then dried under vacuum at 50° C. for about 16 hours. The conversion was calculated from the weight of monomer charged and the weight of polymer obtained. The dry polymers were analyzed for microstructure and X-ray crystallinity. The results are shown in Table I.

TABLE I

| Bottle No. | 1 | 2 | 3 |
|---|---|---|---|
| Polymerization Temperature (° C.) | 15 | 30 | 65 |
| Li-n-butyl ($10^{-3}$ moles) | 5.5 | 6.25 | 7.5 |
| Percent Conversion | 82 | 86 | 78 |
| Percent trans-1,4 content | 97 | 96 | (¹) |
| Percent Crystallinity | 28 | 24 | 28 |

¹ Not tested.

The physical properties of the raw polymers from bottles 1 and 2 were determined and compared to those of purified Balata. Test data are presented in Table II.

TABLE II

| Polymer | Bottle 1 | Bottle 2 | Balata |
|---|---|---|---|
| Tensile Strength (p.s.i.) | 7,160 | 6,300 | 5,800 |
| Percent Elongation at break | 425 | 430 | 450 |
| 300% Modulus (p.s.i.) | 4,720 | 4,080 | 3,600 |
| Instron Hardness (lbs./in.) | 45 | 34 | 26 |
| Tear strength (lbs./in.) | 300 | 187 | 110-160 |
| Rate of hardening: | | | |
| Original Wallace hardness | 97 | 97 | 98 |
| Wallace hardness after 3 min. of cooling | 60 | 70 | 90.5 |
| Wallace hardness after 8 min. of cooling | 93 | 96.5 | 98 |

The results indicate that polymers prepared in bottles 1 and 2 are superior to Balata with respect to tensile strength, modulus, hardness and tear strength and only slightly inferior in the rate of hardening.

*Example II*

Isoprene was polymerized as in Example I except that the following recipe was used in 7-ounce bottles:

Benzene _____milliliters__ 50
$TiCl_4$ _____moles__ $0.1 \times 10^{-3}$
$VCl_4$ _____do____ $0.5 \times 10^{-3}$
Isoprene (3.4 gms.) _____milliliters__ 5.0
Li-n-butyl _____ Variable The polymerization was carried out at 30° C. for 2 hours. The reaction was stopped by injecting about 5 milliliters of ethanol. The products were then recovered and analyzed as in Example I. The results are shown in Table III.

TABLE III

| Bottle No. | Li-n-butyl ($10^{-3}$ moles) | Molar Ratio Li/V | Conversion (percent) | Crystallinity (percent) |
|---|---|---|---|---|
| 1 | 1.0 | 2.0 | 28.0 | (¹) |
| 2 | 1.38 | 2.75 | 76.5 | (¹) |
| 3 | 1.5 | 3.0 | 82.4 | 25 |
| 4 | 1.62 | 3.25 | 64.8 | 25 |

¹ Not tested.

*Example III*

Isoprene was polymerized as in Example II except that the Li-n-butyl charge was constant at $1.5 \times 10^{-3}$ moles and the amount of $TiCl_4$ was varied. The results are shown in Table IV.

TABLE IV

| Bottle No. | $TiCl_4$ ($10^{-3}$ moles) | Mole Ratio $TiCl_4/VCl_4$ | Conversion (percent) | Crystallinity (percent) |
|---|---|---|---|---|
| 1 | 0.05 | 0.1 | 41.2 | (¹) |
| 2 | 0.12 | 0.25 | 73.5 | 22 |
| 3 | 0.15 | 0.3 | 76.5 | 25 |
| 4 | 0.20 | 0.4 | 76.5 | 25 |

¹ Not tested.

*Example IV*

Isoprene was polymerized as in Example II except in the absence of $TiCl_4$. The following recipe was used:

Benzene _____milliliters__ 100
$VCl_4$ _____moles__ $1.0 \times 10^{-3}$
Isoprene _____milliliters__ 10
Li-n-butyl _____ Variable The polymerization reaction was carried out at 30° C. for 16 hours. The results are shown in Table V.

TABLE V

| Bottle No. | Li-n-butyl ($10^{-3}$ mole) | Conversion (percent) | Crystallinity (percent) |
|---|---|---|---|
| 1 | 1.25 | 14.0 | 15 |
| 2 | 1.75 | 25.7 | 20 |

It is seen that the crystallinity of polymers prepared in the absence of a titanium compound is markedly less than that of the polymers produced in Examples I, II and III.

*Example V*

Isoprene was polymerized as in Example I except that $4.5 \times 10^{-3}$ moles of secondary butyl lithium and tertiary butyl lithium were used instead of normal butyl lithium. The reaction was carried out at 30° C. for 16 hours. The results are presented in Table VI.

TABLE VI

| | Li-sec-butyl | Li-tert-butyl | Control (Li-n-butyl) |
|---|---|---|---|
| Percent conversion | 86 | 68 | 80 |
| Percent crystallinity | 27 | (¹) | 26 |
| Percent trans 1,4 content | 96 | (¹) | 94 |

¹ Not tested.

The structure of the resulting polymers appear to be independent of the hydrocarbon radical in the lithium compound.

Example VI

Isoprene was polymerized using the procedure of Example II except that the charging sequence of the catalyst components was reversed. Lithium-n-butyl was charged before the addition of isoprene and a 5/1 mixture on a molar basis of $VCl_4$ and $TiCl_4$ was added last. The following recipe was used:

Benzene _____ milliliters__ 70
Li-n-butyl _____ Variable
Isoprene _____ milliliters__ 7
$VCl_4$–$TiCl_4$ mixture _____ moles__ $0.55 \times 10^{-3}$ Reaction was carried out at 30° C. for 16 hours and the results are shown in Table VII.

TABLE VII

| Bottle No. | Li-n-butyl ($10^{-3}$ moles) | Conversion (percent) | Crystallinity (percent) |
|---|---|---|---|
| 1 | 0.625 | 10.6 (32.0) | (1) |
| 2 | 1.0 | 91.5 (91.5) | 30 (29) |
| 3 | 1.5 | 68.1 (78.8) | 32 (28) |

1 Not tested.

The figures in brackets refer to control experiments using the above recipe but in which the charging sequence was the same as in Example II.

Example VII

Isoprene was polymerized using the procedure of Example II except that $TiCl_3I$ was used in place of $TiCl_4$ using the following recipe:

Benzene _____ milliliters__ 75
$VCl_4$ _____ $0.6 \times 10^{-3}$
$TiCl_3I$ _____ Variable
Isoprene _____ milliliters__ 7
Li-n-butyl _____ Variable The reaction was carried out at 30° C. for 16 hours. The results are presented in Table VIII.

TABLE VIII

| Bottle No. | Li-n-butyl ($10^{-3}$ mole) | $TiCl_3I$ ($10^{-3}$ mole) | Conversion (percent) | Crystallinity (percent) |
|---|---|---|---|---|
| 1 | 1.5 | 0.06 | 57.5 | 25 |
| 2 | 1.25 | 0.18 | 89.4 | 28 |
| 3 | 2.0 | 0.25 | 76.6 | 28 |

Example VIII

Isoprene was polymerized as in Example VII except that $0.125 \times 10^{-3}$ moles of $TiCl_4$ and $1.65 \times 10^{-3}$ moles of Li-n-butyl were used instead of $TiCl_3I$ and variable lithium butyl, respectively and cyclohexane and n-heptane and their mixtures with benzene were used as a diluent. The reaction was carried out at 60° C. for 16 hours. The results are presented in Table IX.

TABLE IX

| Bottle No. | Diluent | Percent Conversion | Percent Crystallinity |
|---|---|---|---|
| 1 (Control) | Benzene | 74.5 | 30 |
| 2 | 80/20 benzene/cyclohexane | 63.8 | 29 |
| 3 | Cyclohexane | 66.0 | (1) |
| 4 | 80/20 benzene/heptane | 78.7 | 28 |
| 5 | Heptane | 38.6 | (1) |

1 Not tested.

The structure of the polymers from bottles 3 and 5 was not determined since they had the appearance of high trans-1,4 polymers.

Example IX

Butadiene-1,3 was polymerized according to the procedure of Example II using the following recipe:

Benzene _____ milliliters__ 120
$TiCl_4$ _____ Variable
$VCl_4$ _____ moles__ $0.5 \times 10^{-3}$
Butadiene-1,3 (6.2 grams) _____ milliliters__ 10
Li-n-butyl _____ moles__ $1.6 \times 10^{-3}$ The reaction was carried out at 20° C. for 16 hours. The results are given in Table X.

TABLE X

| Bottle No. | $TiCl_4$ ($10^{-3}$ moles) | Conversion (percent) | Crystallinity (percent) |
|---|---|---|---|
| 1 | Nil | 4.8 | (1) |
| 2 | 0.10 | 51.6 | 46 |
| 3 | 0.20 | 82.3 | 49 |
| 4 | 0.30 | 87.2 | 49 |
| 5 | 0.50 | 74.2 | 46 |

1 Not tested.

The run in bottle 1 is not in accordance with the present invention but is included for comparative purposes. The above crystallinity levels are typical of polybutadiene having a trans content above 90%.

Example X

Butadiene-1,3 and isoprene were copolymerized according to the procedure of Example II using the following recipe:

Benzene _____ milliliters__ 120
Butadiene-1,3 _____ Variable
Isoprene _____ Variable
$TiCl_4$ _____ moles__ $0.2 \times 10^{-3}$
$VCl_4$ _____ do____ $0.5 \times 10^{-3}$
Li-n-butyl _____ do____ $1.6 \times 10^{-3}$ The ingredients were injected into 7-ounce bottles in the order shown in the above recipe. The reaction was carried out at 20° C. for 6 hours. The results are shown in Table XI.

TABLE XI

| Bottle No. | Butadiene/Isoprene weight ratio | Percent Conversion | Percent Crystallinity |
|---|---|---|---|
| 1 | 8/2 | 60 | 39.2 |
| 2 | 6/4 | 56 | 29.4 |
| 3 | 4/6 | 37 | 25.0 |
| 4 | 3/7 | 81 | <5 |
| 5 | 2/8 | 73 | 1 24.8 |

1 Crystallinity of trans-1,4 polyisoprene type. All the other copolymers showed a crystallinity of the trans-1,4 polybutadiene type.

The above results show that high trans-1,4 copolymers of butadiene and isoprene can be produced according to the invention and the degree of crystallinity depends upon the relative proportions of butadiene and isoprene present in the copolymer. Substantially amorphous copolymers are produced when the copolymer contains about 30 to 40 weight percent butadiene.

I claim:
1. A process of producing a trans-1,4 polymer of isoprene having more than about 20 percent of X-ray crystallinity and a trans-1,4 content of at least 90 percent, which comprises polymerizing at a temperature of from 0° C. to 100° C. isoprene whilst dispersed in an inert organic liquid, in the presence of a catalyst comprising (a) vanadium tetrachloride, (b) a titanium tetrahalide selected from titanium tetrachloride and titanium trichloro-monoiodide, and (c) an alkyl lithium having one to twelve carbon atoms in the alkyl group, the alkyl lithium and vanadium tetrachloride being admixed in the presence of isoprene in a molar ratio of from 1:1 to 5:1, and the molar ratio of the titanium tetrahalide to vanadium tetrachloride being from 0.01:1 to 1:1.

2. The process as claimed in claim 1 in which the titanium compound is titanium tetrachloride.

3. The process as claimed in claim 1 in which the titanium compound is titanium trichloro-monoiodide.

4. The process as claimed in claim 1 in which the molar ratio of the lithium alkyl to vanadium tetrachloride is from 2:1 to 4:1.

5. The process as claimed in claim 4 in which the molar ratio of the titanium tetrahalide to vanadium tetrachloride is from about 0.2:1 to about 0.4:1.

References Cited

UNITED STATES PATENTS

| 2,977,349 | 3/1961 | Brockway et al. | 260—94.3 |
| 3,218,266 | 11/1965 | Ludlum | 260—94.9 |

FOREIGN PATENTS

| 215,043 | 11/1956 | Australia. |
| 884,249 | 12/1961 | Great Britain. |
| 886,371 | 1/1962 | Great Britain. |

JOSEPH L. SCHOFER, *Primary Examiner.*

E. J. SMITH, D. K. DENENBERG, *Assistant Examiners.*